| United States Patent [19] | [11] | 4,112,222 |
|---|---|---|
| Jarowenko | [45] | Sep. 5, 1978 |

[54] METHOD OF PREPARING HYDROXYPROPYLATED STARCH DERIVATIVES

[75] Inventor: Wadym Jarowenko, Plainfield, N.J.

[73] Assignee: National Starch and Chemical Corp., Bridgewater, N.J.

[21] Appl. No.: 757,634

[22] Filed: Jan. 7, 1977

[51] Int. Cl.$^2$ ............... C08B 31/10; C13L 1/08
[52] U.S. Cl. .................................. 536/111
[58] Field of Search .......................... 536/111

[56] References Cited

U.S. PATENT DOCUMENTS

| 2,900,268 | 8/1959 | Rankin et al. | 536/111 |
| 3,033,853 | 5/1962 | Klug | 536/111 |
| 3,725,386 | 4/1973 | Hanson et al. | 536/111 |

*Primary Examiner*—V. P. Hoke
*Attorney, Agent, or Firm*—James & Franklin

[57] ABSTRACT

An improved method for producing granular, cold-water dispersible hydroxypropylated starch derivatives comprises reacting a granular starch base with propylene oxide in the presence of sodium acetate or another water-soluble salt of a selected carboxylic acid. The resulting starch product, which upon purification is free of toxic by-products and has no perceptible off-taste, finds use as a thickener in food as well as in non-food applications.

24 Claims, No Drawings

METHOD OF PREPARING HYDROXYPROPYLATED STARCH DERIVATIVES

BACKGROUND OF THE INVENTION

This invention relates to an improved method for preparing granular hydroxypropylated starch ethers having the property of cold-water dispersibility.

The preparation of highly-substituted starch and cellulose products by the use of reagents such as alkylene oxides or halohydrins under alkaline conditions is well known. However, the necessity for large quantities of these reagents and the strongly alkaline nature of the reaction media often results in destruction of the original granular structure of the starch along with concurrent problems of starch degradation, purification and recovery. While a low degree of substitution is easily achieved through reactions in aqueous media, the resulting starch lacks the necessary stabilization characteristics of the more highly substituted starches. Reactions in water-miscible solvents have been considered as a possible alternative, but are costly and offer little improvement over methods of the prior art.

To overcome these difficulties the use of "dry reactions" has been investigated. Such reactions are described in early German patents disclosing the treatment of dry commercial starches directly with a large excess of ethylene oxide under pressure, with starch-like or plastic-rubbery masses resulting therefrom. Large amounts of by-products are accumulated in working these processes, the disposal of which leads to considerable waste of reagents. A solution to this problem is disclosed in U.S. Pat. Nos. 2,516,634; 3,705,891; and 3,725,386 whereby neutral salts of inorganic acids are used as catalysts, hence eliminating the necessity for excess reagents and alkali. Typical catalysts employed in the processes of these patents include sodium chloride, sodium sulfate, calcium chloride, and water-soluble salts of phosphoric acid. While presenting an improvement over the prior art, the processes of these patents, nonetheless, suffer from some serious disadvantages. The use therein of water-soluble salts of mineral acids (such as hydrochloric, sulfuric, phosphoric, etc.) leads to formation of highly substituted starch fractions consisting of such undesirable and toxic by-products as chlorinated, sulfated, etc. hydroxypropyl compounds which must subsequently be removed in the purification procedure. The low solubility of these salts in solvents such as ethanol is a further disadvantage, leading to higher ash content and/or to an off-taste of the modified starches.

Accordingly, it is an object of this invention to provide a method of producing a superior hydroxypropylated starch ether retaining its original granular form and having improved cold-water dispersibility and no discernible off-taste.

Another object is to provide such a method capable of producing, in one embodiment thereof, a cold-water dispersible granular product which is essentially free of salts and the by-products therefrom and therefore suitable for human consumption.

A further object is to provide such a method capable of producing, in another embodiment thereof, a cold-water dispersible granular product useful as a thickener in industrial applications.

A still further object is to provide a method of producing a cold-water dispersible hydroxypropylated starch ether which reduces the toxicity and the quantity of the by-products.

SUMMARY OF THE INVENTION

The above and related objects are achieved in a method of producing a granular hydroxypropylated starch ether which is cold-water dispersible and, in certain embodiments, particularly acceptable for food use. The method involves reacting a granular starch base having a moisture content of about 6–20% based on the weight of the starch with about 15–50% propylene oxide by weight, the reaction being carried out for about 4.5–24 hours at a temperature of about 70°–100° C. and a pressure of about 10–100 p.s.i.g. The novel steps reside in impregnating the starch base with about 0.25–5.0% based on the weight of the dry starch base, of a catalyst salt wherein the salt is a water-soluble alkali or alkali earth salt of a carboxylic acid which is unsubstituted or alkyl- or hydroxy-substituted, having no more than 20 carbon atoms in total, and, if aliphatic, having from 1 to 6 carbon atoms in its primary carbon chain, and conducting the reaction in the presence of the salt.

In a preferred embodiment, the carboxylic acid is an aliphatic monocarboxylic acid, dicarboxylic acid or tricarboxylic acid. In a particularly preferred embodiment, the catalyst salt is the sodium or potassium salt of a carboxylic acid selected from the group consisting of acetic, ascorbic, citric and tartaric acid (with sodium acetate and potassium acetate being most preferred), and the starch base impregnated with this salt is reacted with about 20–25% propylene oxide by weight.

In another preferred embodiment, the starch base is impregnated with about 0.50–1.50%, based on the weight of the dry starch base, of the salt and has a moisture content of 10–17%, based on the weight of the starch. It is also preferred that the starch base be reacted with about 20–30% propylene oxide by weight, with the reaction being carried out for about 5.0–10 hours at a temperature of about 90°–98° C. and at a pressure of about 30–35 p.s.i.g.

The salt is added to the starch base, in a further embodiment, as a salt or as a salt-containing solution. In a still further embodiment, the salt is formed in situ in a slurry of the starch base. In one procedure the salt is formed in situ by addition of the acid or an acid-producing material (preferably a lactone or anhydride) to the starch base, followed by addition of an alkali or alkali earth base to a pH of about 7–10, preferably 7–8. In an alternative procedure, the salt is formed in situ by alternate addition of an alkali or alkali earth base and an acid-producing material (preferably an anhydride) to the starch base until the starch base is substituted with up to about 3% by weight of the anionic constituent of the salt and a final pH of 7–10 is obtained, with the slurried substituted starch base being thereafter filtered and dried without washing prior to conducting the reaction. After formation of the salt in situ, the slurried starch base is typically filtered and dried to a moisture content of about 6–20% by weight prior to conducting the reaction.

After completion of the reaction, the starch product is recovered preferably by adjusting the pH to about 3.5–7.0 prior to washing the subsequent drying of the material. The starch product is typically washed with a water-alcohol mixture (preferably water-ethanol) having a water content of about 10–50%.

The novel invention described herein is based on the discovery that by using the water-soluble alkali or alkali earth salts of selected carboxylic acids as catalysts in the substantially dry reaction of starch with propylene oxide, an improved product is formed. The salts and by-products originating therefrom are more soluble in ethanol or an aqueous ethanol mixture than their counterparts in the prior art, and hence are more easily and completely removed in the purification process. This represents an economic advantage, since lesser quantities of alcohol are used and less heating is required. Furthermore, salts of acetic acid and the corresponding by-products are less toxic than the salts and resulting by-products of, for instance, phosphoric and sulfuric acid, so that the purified starch product obtained therefrom is more suitable for human consumption. As a further advantage, the off-taste characteristic of products prepared from prior art methods is not present in the purified product of the present invention.

DETAILED DESCRIPTION OF THE PREFERRED EMBODIMENTS

According to the present invention any starch type, whether native or converted, may be used as the base for preparing the cold-water dispersible starch products, providing it contains reactive hydrogen groups. Such starches include those derived from any plant source, for example, corn, potato, sweet potato, rice, sago, tapioca, waxy maize, sorghum, wheat and high amylose corn. Also included among the suitable starches are the various starch derivatives such as ethers, esters and thin-boiling types made by known processes comprising, for example, acid treatments, and oxidative, enzymatic or thermal degradations. Other starches useful in the present method are the starch dextrins, fractions such as amylose or amylopectin and other depolymerized starch products, and those starches inhibited with polyfunctional reagents such as epichlorohydrin, phosphorus oxychloride, acrolein, etc.

In cases where the product is to be employed as a thickener, starches such as corn, waxy maize and potato, which impart a high viscosity to the product, are preferred over the thin-boiling type or high amylose starches. Particularly preferred are those starch bases inhibited with polyfunctional reagents as above-described because they are capable of producing thickeners having improved shear resistance and stabilized viscosity.

The water-soluble salts useful as catalysts for the reaction are those derived from aliphatic carboxylic acids (such as monocarboxylic acids, dicarboxylic acids and tricarboxylic acids) or aromatic carboxylic acids (such as benzoic or phthalic acid), the aliphatic carboxylic acids being preferred. The salts may be unsubstituted, alkyl-substituted or hydroxy-substituted. The salts of the aliphatic carboxylic acids have from 1 to 6 carbon atoms in their primary chain and no more than 20 carbon atoms in total; the salts of the aromatic carboxylic acids have no more than 20 carbon atoms in total. The metal cation of such salts is an alkali or alkali earth metal such as, for example, sodium, potassium, lithium, calcium or magnesium. The salts preferred for food use are derivatives of the aliphatic acids already present in the human diet, such as acetic, citric, tartaric and ascorbic acid. Typical salts include, for example, sodium acetate, potassium acetate, sodium citrate, potassium citrate, potassium tartarate and sodium ascorbate. Particularly preferred among these salts are sodium acetate and potassium acetate.

The starch impregnation must occur prior to reaction of the starch with propylene oxide. In one procedure impregnation of the starch is accomplished by suspending the starch in about 1.2 to 2 parts of water per part of starch to form a slurry and adding the salt catalyst to the starch slurry, whereupon the starch is filtered and dried. The salt can be added directly (i.e., as a salt) or formed in situ. The salt may be formed in situ by adding the acid or an acid producing material to the starch slurry and thereafter adjusting the pH to about 7–10, preferably 7–8, with an alkali or alkali earth base (such as sodium hydroxide or potassium hydroxide). Alternatively, the salt may be formed in situ by alternate addition of an alkali or alkali earth base and an acid-producing material (e.g., an anhydride) to the starch base until the starch base is substituted with up to about 3% by weight of the anionic constituent of the salt (e.g., an acetyl substituent resulting from use of acetic anhydride). When the desired amount of substitution is obtained and the final pH of the starch slurry is about 7–10, the slurried substituted starch is filtered and dried without washing prior to conducting the reaction. The term "acid-producing material" is meant to include such compounds as, for example, a lactone or anhydride which forms the acid upon hydrolysis. In an alternative procedure for impregnation of the starch, the catalyst salt is dissolved in a small amount of water and the solution is then sprayed as uniformly as possible onto the dry starch powder, whereupon the starch is dried if necessary. In this alternative procedure for impregnating the starch, the salt cannot be formed in situ. It is important that the catalyst salt be evenly distributed throughout the starch to insure uniform reactivity. The procedure wherein the salt is formed in situ in a starch slurry approaches uniform distribution of the salt and is therefore preferred.

The amount of catalyst salt to be used is about 0.25–5.0%, preferably about 0.5–1.5%, based on the dry weight of the starch. (Salts of formic, ascorbic, citric and tartaric acids usually are required in larger quantities than 1%, although some reaction will occur at lower concentrations.) Reactivity is markedly reduced if less than 0.25% of the catalyst is used, and amounts greater than 5% do not result in improvements which would justify the added cost.

The pH of the impregnated starch base is typically maintained at about 7–10, preferably 7–8. Outside of this range the reactivity is either too low at the lower pH level or too high at the higher pH. Under basic conditions the concentration of by-products is increased, while under acidic conditions it is more difficult to obtain products having cold-water dispersibility.

Before reaction with propylene oxide, the impregnated starch base must have a moisture content of about 6–20%, depending on the type of starch, and preferably 10–17% based on the weight of the starch. If necessary to achieve the proper moisture level the starch base is dried after impregnation. Commercially-dried starch as sold in bulk usually has a moisture level of 10–14% (13–18% in the case of potato starch). This represents the normal amount of water that starch tends to remain under normal drying conditions or when equilibrized at ambient humdity. If the impregnated starch is overdried (to less than 6% moisture), the penetration of propylene oxide into the granules will be reduced, thus impairing the reactivity of the starch. With a moisture content above 20% the starch may cake in the reactor and present handling problems.

When the drying process (if any) is complete, the impregnated starch is treated directly with propylene oxide in a pressure reactor. The propylene oxide may be added to the starch all at one time or in small controlled increments. The latter method of addition, wherein the starch is stirred to insure complete reaction, is found to be most effective.

The amount of propylene oxide necessary for reaction depends to a considerable degree on the type of starch and its prior modification, if any, and the ultimate use of the starch, but usually is about 15–50% by weight of the starch, preferably 20–30%. For food use it is particularly preferred to use 20–25% propylene oxide by weight. Native starches such as corn, waxy maize, high amylose corn, potato and tapioca require about 25% for cold-water dispersibility, while inhibited starch types may require more than 30% to become cold-water dispersible.

The reaction time, temperature and pressure are all interdependent and may vary over a fairly broad range. For best results it is advisable to maintain these reaction parameters within the preferred limits as set forth below.

The reaction time may vary from about 4.5 to about 24 hours, but is preferably about 5.0–10 hours. The reaction temperature may range from about 70° to about 100° C., but is preferably about 90°–98° C. Below about 70° C. the reaction rate is slowed considerably. The pressure may range from about 10 to about 100 p.s.i.g., but is preferably about 30–35 p.s.i.g., lower pressures resulting in longer reaction times. Pressures up to about 100 p.s.i.g. are allowable providing the equipment can tolerate such conditions, but pressures much higher are not advisable in larger-scale preparations. Use of extreme reaction conditions such as high concentrations of reagent and high temperatures and pressures may lead to explosive reactions. To avoid air oxidation, the reactions are preferably conducted under conditions wherein the air is at least partially replaced by nitrogen or another inert gas.

After completion of the reaction the pressure is released and the product ordinarily recovered by adjusting the pH to the range of about 3.5–7.0, followed by purification and subsequent drying of the starch product.

The purification procedure used herein typically involves suspending the crude starch product in a water-alcohol mixture having a water content of about 10–50% by weight. Washing with alcohol alone is possible, but traces of certain contaminants will still remain in the products. If the amount of water in the water-alcohol mixture is greater than 50%, the starch will most likely swell, thus losing its granular structure. Alcohols which may be used include methanol, ethanol, propanol, isopropanol and butanol, but the preferred alcohol is ethanol due to its easy removal and its greater effectiveness in removing the by-products from the crude starch material. The pH of the water-alcohol mixture is preferably adjusted and maintained at a range of about 3.5–7.0, this range tending to maintain the granular property and minimize hydrolysis of the starch.

The extent of purification is not critically dependent on the relative amounts of solvent and crude starch mixed together, but preferably about two parts by weight of the water-alcohol mixture are added per part of starch material. In the washing procedure elevated temperatures may be employed but are not required, as the contaminating by-products from the reaction are quite soluble in the specified water-alcohol mixture at room temperature. High temperatures will in fact result in partial evaporation of the alcohol mixture, so that ambient conditions are preferred. The washing process removes essentially all of the by-products of the reaction, which comprise highly-substituted starch fractions and dimers and trimers of propylene glycol derived from the reactant propylene oxide.

EXAMPLES

The following examples further illustrate the efficacy of the present invention. In these examples all percentages are given by weight and all temperatures in degrees Celsius unless otherwise specified.

The property of cold-water dispersibility as used herein is understood to be equivalent to the property of cold-water swelling. The granules of a starch which is cold-water dispersible will swell in cold water to form a colloidal solution which is both cohesive and viscous.

In the test for cold-water dispersibility utilized herein, a sufficient amount of the starch is added to a quantity of cold water with agitation to form a suspension having a concentration of about 5.0–7.5% by weight of starch solids. Cold-water dispersibility is measured mainly by the extent to which the starch particles remain suspended in the colloidal solution when agitation is discontinued. Starches which are completely cold-water dispersible will exhibit no settling out of the particles while those which are somewhat cold-water dispersible will exhibit partial settling of the particles out of solution.

When the starch is added to the cold water the resulting suspension is initially cloudy, but as more of the granules swell and become dispersed in the water, the clarity of the suspension improves. The amount by which the clarity improves is another measure of the degree of cold-water dispersibility of the starch.

EXAMPLE I

This example demonstrates the effect on the reaction efficiency of using varying amounts of catalyst salt.

Waxy maize, inhibited with epichlorohydrin by the method of Example I of U.S. Pat. No. 2,500,950, was used as the starch base throughout this example.

A series of dry starch samples was impregnated with glacial acetic acid in the amounts of 0.25, 1.00, and 2.50%, respectively, based on the starch, neutralized to pH 8.0 with 3% sodium hydroxide, filtered, and dried to a moisture content of about 8%. Fifty grams of each of the resulting dry starch samples was placed in a pressure reactor in which the air had been replaced by nitrogen. Then 12.5 grams of propylene oxide (25% based on the starch) was added to the samples. The resulting mixture was heated at 90°–95° C. in the sealed container for 5 hours.

After cooling to room temperature, the starch samples were suspended in a 0.4:1 water-ethanol mixture which was then adjusted to pH 5.5 with acetic acid. Purification was accomplished by suspending the starch in a water-ethanol mixture (one part starch to two parts water-ethanol), filtering, and repeating the procedure twice more. The water content of the water-ethanol mixture used for the washings was 40, 20, and 10%, respectively, for the first, second and third washes. As listed in Table I, the products were generally cold-water dispersible, had a low ash content and good texture, and possessed no off-taste.

TABLE I

| Acetic Acid (% on Starch) | Cold-Water Dispersibility | Ash Content (% DB)[a] | Texture (at 7.5% solids in cold water) | Clarity | Results of Taste Test[b] |
|---|---|---|---|---|---|
| 0.25 | some | 0.32 | Heavy, short sol | Somewhat cloudy | Excellent |
| 1.00 | complete | 0.66 | Heavy, short sol | Clear improving | Excellent |
| 2.50 | complete | 0.99 | Heavy, short sol | Clear improving | Excellent |

[a] % DB is the percentage based on the weight of the starch when dried to 0% moisture (dry basis).
[b] The taste of the starch was rated by a panel of five experienced judges, using standard testing procedures.

EXAMPLE II

This example demonstrates the effect on the reaction of varying the concentration of propylene oxide used.

Waxy maize, inhibited as in Example I, was treated with 5% acetic anhydride and base according to the procedure as set forth in Example I of U.S. Pat. No. 2,461,139, filtered, and without washing dried to about 6% moisture. Upon analysis the dried material was found to contain 1.74% acetyl groups (dry basis). Three samples of this dried acetylated product were then reacted with 15, 20, and 25%, respectively, of propylene oxide based on the starch, according to the procedure of Example I. The results are listed in Table II. A cold-water dispersible product was obtained only upon treatment with 25% propylene oxide. It is seen that prior acetylation and base treatment of the starch base, whereby sodium acetate is produced in situ (and not washed from the starch) has the same effect as impregnating the starch with a catalyst salt.

TABLE II

| Propylene Oxide (% based on starch) | Approximate Temprature at which Starch is Dispersed (° C.) | Texture (at 5% solids in cold water) |
|---|---|---|
| 15 | 37 – 65 | heavy cohesive sol |
| 20 | 31 | heavy salve-like sol |
| 25 | less than 25° C. (cold-water dispersible) | very heavy salve-like sol |

EXAMPLE III

This example demonstrates the necessity for impregnating the starch base with a salt prior to reaction with propylene oxide.

A sample of waxy maize, inhibited as in Example I, was reacted without prior impregnation with propylene oxide according to the procedure of Example I. Another sample of inhibited waxy maize was reacted with propylene oxide in the same manner, but after being impregnated with about 0.25% glacial acetic acid, adjusted to pH 8.0 with sodium hydroxide, filtered and dried. The results obtained are given in Table III. Only the impregnated starch gives a product which is dispersible in cold water.

TABLE III

| Prior Impregnation of Starch | Cold-Water Dispersibility of Starch Product |
|---|---|
| none | none |
| impregnated | complete |

EXAMPLE IV

This example demonstrates the effect of reaction time on the cold-water dispersibility of the final product.

A series of waxy maize dry starch bases, inhibited as in Example I, was impregnated by suspension in water containing about 0.25% acetic acid, based on the weight of the starch, at a pH adjusted with sodium hydroxide to either 7 or 8. These treated starches were then recovered by filtration and dried to either 12 or 14% moisture, depending on the pH. The starches thus prepared were reacted with propylene oxide, according to the procedure of Example I, with the exception that the reaction time was varied. The results are listed in Table IV. From the data it is seen that a product having cold-water dispersibility is obtained only when the reaction is allowed to proceed for about 5 hours. The difference in results upon changing the pH of the impregnating medium is very slight so that a pH of 7 or 8 is equally preferred.

TABLE IV

| pH of the Impregnating Medium | Moisture Content of Dried Impregnated Starch (%) | Reaction Time (hours) | Approximate Temperature at which Starch is Dispersed (° C.) |
|---|---|---|---|
| 8 | 12 | 1 | 75 |
| " | " | 2 | 70 |
| " | " | 3 | 62 |
| " | " | 4 | 35 |
| " | " | 5 | 25 |
| 7 | 14 | 1 | 75 |
| " | " | 2 | 73 |
| " | " | 3 | 66 |
| " | " | 4 | 40 |
| " | " | 5 | 25 |

EXAMPLE V

This example illustrates the preparation of cold-water dispersible, granular, hydroxypropylated corn starch.

Corn starch was impregnated with 0.5% glacial acetic acid, adjusted to pH 8.0 with sodium hydroxide, dried to 12.0% moisture, and reacted with propylene oxide according to the method of Example I. The resulting product was cold-water dispersible. Analysis revealed that the product contained 12.5% hydroxypropyl groups (dry basis) and had an ash content of 0.18%.

EXAMPLE VI

This example demonstrates the use of an inhibited starch base in preparing a starch product which exhibits sufficient stabilization in viscosity to be highly useful as a thickener.

Corn starch was partially inhibited with epichlorohydrin as in Example I. The starch was then impregnated with 0.5% glacial acetic acid, adjusted with sodium hydroxide to pH 8, dried to 12.0% moisture, and reacted with propylene oxide according to the procedure of Example I. The product, with a content of hydroxypropyl groups of about 15.6% on a dry basis, displayed the property of cold-water dispersibility. A mixture of the product at 5% concentration in cold water had a viscosity of 650 cps within 10 minutes, which dropped to 600 cps after 3 hours and remained at that value for a period of 24 hours. Hence stabilization in viscosity was achieved in 3 hours.

EXAMPLES VII-XI

These examples illustrate the reaction of propylene oxide with certain native starches which have been impregnated with various catalysts and adjusted, if necessary, to pH 8.0 with sodium hydroxide.

A given starch base was treated with a given amount of a given catalyst salt, filtered, dried to a given moisture content, all as indicated in Table V, and thereafter reacted with propylene oxide according to the procedure of Example I. As may be seen from Table V, the reaction efficiency varies somewhat with the particular combination of catalyst and starch base used. In the case of sodium citrate, the reaction efficiency improves with increasing concentration of the salt.

TABLE V

| Ex. | Starch Base | Catalyst | Catalyst Concentration (% on Starch) | Moisture Content (%) | Cold-Water Dispersibility | Hydroxy-propyl Group (% DB) |
|---|---|---|---|---|---|---|
| VII | inhibited waxy maize | sodium citrate | 0.50 | 12.0 | complete | 15.42 |
| VIII | inhibited waxy maize | sodium citrate | 0.25 | 12.0 | some | 10.88 |
| IX | potato | octenyl-succinic* | 0.50 | 16.4 | some | 11.18 |
| X | corn | succinic* | 0.50 | 12.8 | complete | 13.05 |
| XI | corn | succinic | 0.25 | 12.0 | complete | 13.10 |

*These acids were added as anhydrides, which were hydrolyzed to acids in situ.

Summarizing, the present invention provides an improved method for preparing cold-water dispersible hydroxypropylated starch ethers, at least some of which are suitable for food use, having no off-taste and being free of toxic by-products. In food applications such starch ethers find use as thickeners in puddings, pie fillings, and the like. The starch products of the present invention may also be used in industrial applications in which a colloidal thickener or a certain stability in viscosity is required. Suitable applications include use in secondary oil recovery and use as cement binders, thickeners for agricultural sprays, paint thickeners, and the like.

Now that the preferred embodiments of the present invention have been described in detail, various modifications and improvements thereon will become readily apparent to those skilled in the art. Accordingly the spirit and scope of the present invention are to be limited only by the appended claims, and not by the foregoing specification.

What is claimed is:

1. In a method for producing a granular, cold-water dispersible hydroxypropylated starch ether which comprises reacting a granular starch base having a moisture content of 6-20% based on the weight of the starch with about 15-50% propylene oxide by weight, said reaction being carried out for about 4.5-24 hours at a temperature of about 70°-100° C. and at a pressure of about 10-100 p.s.i.g., the improvement comprising the steps of:
   (a) impregnating said starch base with about 0.25-5.0%, based on the weight of the dry starch base, of a catalyst salt in aqueous solution form, said salt being a water-soluble alkali or alkali earth salt of a carboxylic acid which is unsubstituted or alkyl- or hydroxy-substituted, having no more than 20 carbon atoms in total, and, if aliphatic, having 1 to 6 carbon atoms in its primary carbon chain; and
   (b) conducting said reaction in the presence of said salt.

2. The method of claim 1 wherein said carboxylic acid is an aliphatic monocarboxylic acid, dicarboxylic acid or tricarboxylic acid.

3. The method of claim 2 wherein said carboxylic acid is selected from the group consisting of ascorbic, citric and tartaric acid.

4. The method of claim 2 wherein said carboxylic acid is acetic acid.

5. The method of claim 1 wherein said salt is sodium acetate or potassium acetate.

6. The method of claim 1 wherein said starch base is impregnated with about 0.50-1.50%, based on the weight of the dry starch base, of said salt.

7. The method of claim 1 wherein said reaction is carried out for about 5.0-10 hours at a temperature of about 90°-98° C. and at a pressure of about 30-35 p.s.i.g.

8. The method of claim 1 wherein said starch base is reacted with about 20-30% propylene oxide by weight.

9. The method of claim 1 wherein said starch base has a moisture content of 10-17% based on the weight of the starch.

10. The method of claim 1 wherein said catalyst salt is a sodium or potassium salt, said carboxylic acid being selected from the group consisting of acetic, ascorbic, citric and tartaric acid, and said starch base impregnated with said salt is reacted with about 20-25% propylene oxide by weight.

11. The method of claim 1 wherein said salt is added directly to an aqueous slurry of said starch base.

12. The method of claim 1 wherein said salt is formed in situ in a slurry of said starch base.

13. The method of claim 12 wherein said salt is formed in situ by addition of said acid or an acid-producing material to said starch base, followed by addition of an alkali or alkali earth base to a pH of about 7-10.

14. The method of claim 13 wherein said acid-producing material is a lactone or anhydride.

15. The method of claim 13 wherein said salt is formed in situ by addition of said alkali or alkali earth base to a pH of about 7-8.

16. The method of claim 12 wherein said salt is formed in situ by alternate addition of an alkali or alkali earth base and an acid-producing material to said starch base until said starch base is substituted with up to about 3% by weight of the anionic constituent of said salt and a final pH of 7-10 is obtained, with the slurried substituted starch base being thereafter filtered and dried without washing prior to conducting said reaction.

17. The method of claim 16 wherein said acid-producing material is an anhydride.

18. The method of claim 12 wherein after formation of said salt in situ, said slurried starch base is filtered and dried to a moisture content of about 6–20% by weight prior to conducting said reaction.

19. The method of claim 18 wherein said slurried starch base is dried to a moisture content of about 10–17% by weight.

20. The method of claim 1 wherein, after said reaction, the starch product is recovered by adjusting the pH to about 3.5–7.0.

21. The method of claim 20 wherein, after pH adjustment, said starch product is washed with a water-alcohol mixture having a water content of about 10–50% by weight.

22. The method of claim 21 wherein said water-alcohol mixture is a water-ethanol mixture.

23. The method of claim 1 wherein said salt is added as a salt-containing solution to said starch base in dry form.

24. A method of producing a granular cold-water dispersible hydroxypropylated starch ether comprising the steps of:
 (a) impregnating a granular starch base with about 0.25–5.0%, based on the weight of the dry starch base, of a catalyst salt in aqueous solution form, such that said impregnated starch base has a pH of 7–10, said salt being a water-soluble alkali or alkali earth salt of a carboxylic acid which is unsubstituted or alkyl- or hydroxy-substituted, said salt having no more than 20 carbons in total, and, if aliphatic, having from 1 to 6 carbon atoms in its primary carbon chain;
 (b) drying said impregnated starch base to a moisture content of about 6–20% by weight;
 (c) reacting said dried starch base without aging thereof with 15–50% by weight of propylene oxide, said reaction being carried out for about 4.5–24 hours at a temperature of about 70°–100° C. and at a pressure of about 10–100 p.s.i.g.;
 (d) recovering said reacted starch by adjusting the pH to about 3.5–7.0; and
 (e) washing said reacted starch with a water-alcohol mixture having a water content of about 10–50% and drying said washed starch.

* * * * *